United States Patent [19]

Dewey, Jr.

[11] 4,214,423
[45] Jul. 29, 1980

[54] APPARATUS FOR HARVESTING BEANS OR SIMILAR CROPS

[76] Inventor: Alfred H. Dewey, Jr., 292 S. Main St., Canandaigua, N.Y. 14424

[21] Appl. No.: 943,500

[22] Filed: Sep. 18, 1978

[51] Int. Cl.² ............................................ A01D 45/22
[52] U.S. Cl. ...................................... 56/130; 56/13.5
[58] Field of Search ..................... 56/13.5, 13.6, 13.7, 56/33–35, 119, 126–130

[56] References Cited

U.S. PATENT DOCUMENTS

| | | | |
|---|---|---|---|
| 833,190 | 10/1906 | Williams | 56/98 |
| 1,977,784 | 10/1934 | Ursohel | 56/126 |
| 2,830,425 | 4/1958 | Stanfield | 56/35 |
| 3,415,044 | 12/1968 | Munson | 56/119 |

Primary Examiner—Russell R. Kinsey
Attorney, Agent, or Firm—Martin LuKacher

[57] ABSTRACT

Apparatus is described which is adapted to be mounted to a farm implement for harvesting beans or other similar crops. The apparatus has a pair of flexible belts positioned in a side-by-side fashion with each belt mounted on a pair of drive pulleys which in turn are mounted to axles supported by a frame. The pair of flexible belts each carry about their perimeter a plurality of flexible protruding members for gentle engagement with the stalk of the bean plant or similar crop. Stripper discs are coaxially mounted to the axles carrying the flexible belts for separating the bean pods and tops from the stalks. Cutter discs are placed below the stripper discs for cutting the bean pods and tops from the stalks without injury to the bean pods.

15 Claims, 6 Drawing Figures

APPARATUS FOR HARVESTING BEANS OR SIMILAR CROPS

This invention relates to a harvester for crops.

The invention is especially suitable for use in harvesting leguminous crops such as beans and enables the plant to be gently lifted from the ground by a plurality of flexible support members positioned about a cooperating pair of pulleys and introduced to a means of efficiently separating the crop from the stalk and thereafter cutting same without incurring damage to the crop.

In the past, apparatus for use in harvesting leguminous crops, especially beans from bean plants have, for instance, been of the type wherein a pair of cutting blades are positioned in front of a farm tractor. As the farm tractor is moved along the row of crops to be harvested, the cutting blades are arranged so that they are positioned approximately one inch under ground. The stalks of the plants being harvested are gathered in at the wide portion of the cutting blades and are channeled down to the area where the blades come together. When the plants engage this area of the cutting blades they are intended to be severed. The severed bean plants are then left in windrows along the ground. An appropriate harvesting combine would thereafter be moved along the windrows to pick up the piles of severed bean plants. The collected bean plants would then be delivered to a thresher where the bean crop would be separated from the bean stalk. This method of harvesting is not very acceptable in that in the first operation the cutting blades carried by the farm tractor are positioned underground, where various foreign articles can become wedged into the cutting area of the blades. This could cause a jam and the failure of the blades to cut the stalk of the plants. The operation would then have to be halted while the foreign matter is cleared from the cutting blades. Some farmers have even gone to the extent of having a platform mounted to the front of their harvesters to enable a laborer to be stationed thereon to quickly detect a jam and to remove the article causing the jam so that the harvesting could continue. In some harvesting operations as much as 35% to 40% of the bean crop may be lost if this harvesting method is used.

A further problem involved in using cutting blades described above, is that the crop can not be harvested if there has been rainfall of any extent, or excessive moisture as may be caused by dew formation, just prior to the time the crop would be harvested by the harvesting combine. The ground generally must be dry enough to allow the blades to move therethrough without excessive jamming. If the ground is overly wet, as it would be after a rainfall or excessive dew, the cutting blades would continually clog and it would become extremely difficult to continue the harvesting in an economical manner.

A still further problem encountered by using the apparatus of the past has been that the plants cut by the shears carried by the tractor are generally deposited into windrows where they are, ideally, allowed several days drying time before they are collected and separated by a harvesting combine. This can become a severe problem if the weather changes. Should rain fall on the crop the drying-out process does not occur. Rain can further cause a problem by causing the ground to become so muddy that no harvesting apparatus can be supported by it. The harvested plants, therefore, can not be collected up from the windrows until the soil dries out at which time the plants may be past the optimum condition for use.

Another method of harvesting crops such as soybeans has recently been mentioned in a periodical called "Farm Show" (Vol. 2, Number 3, 1978). The Farm Show article shows an experimental harvester which uses brushes entrained on belts. The article admits of faults in the harvester which have prevented its introduction onto the marketplace. These faults may be that the nylon brushes positioned about the drive belts are positioned so that the set of brushes on one belt is caused to fully overlap with the opposing set of brushes on the other belt. The crop could become impaled on the brushes and would therefore not be thrown off into the thresher once the stalk has been cut. The cut stalk would continue around on the belt impaled on the nylon brush and could cause a jam in the apparatus. The harvesting process would then have to be stopped while the impaled stalk is cleaned from the nylon brushes. Moreover, the drive mechanism of the experimental harvester is mounted to the ground being worked. Various problems may occur when the drive mechanism is this low, such as dirt or other foreign objects flying up from the ground and causing the mechanism to jam or otherwise malfunction. Again, the harvesting must stop while the problem is cured. This problem would, of course, be most significant if the ground is either overly dry or overly wet. Also, in this experimental harvester the rear pulleys appear to be mounted at the same level as the front pulleys, which are first to gather in the crop. This would not allow for the gentle and smooth system of gathering in the crop, lifting it up away from the ground and thereafter separating and cutting. It would appear that the crop is only gathered in by the brushes which impale the crop and are not gently lifted up and separated.

Other approaches to harvesting of crops with fingers, combs and the like have also been proposed, all of which fail to provide the advantage of this invention (see U.S. Pat. Nos. 1,429,168; 1,977,784; 2,477,122; 2,550,129; 3,587,216 and 3,827,503).

It is accordingly the object of the present invention to provide an improved harvester for crops, such as bean and other leguminuous plants, which can be mounted to conventional combines and which will provide a high yield during harvesting.

Another object of the present invention is to provide an improved harvesting apparatus which gently engages the crop being harvested above ground, gently separates the crop from the stalks, and thereafter cuts the stalk without causing damage to the crop.

A further object of the invention is to provide an improved harvester for leguminous plants which can be successfully used in other than ideal weather without causing damage to the harvested crop.

A still further object of the present invention is to provide an improved harvester for leguminous plants which enables the crop to be harvested and separated from the stalk during the same harvesting sequence. The foregoing and other objects and advantages of the invention will become more apparent from a reading of the following description of a presently preferred embodiment thereof with reference to the accompanying drawings in which.

DETAILED DESCRIPTION OF THE PREFERRED EMBODIMENT

Figure 3:
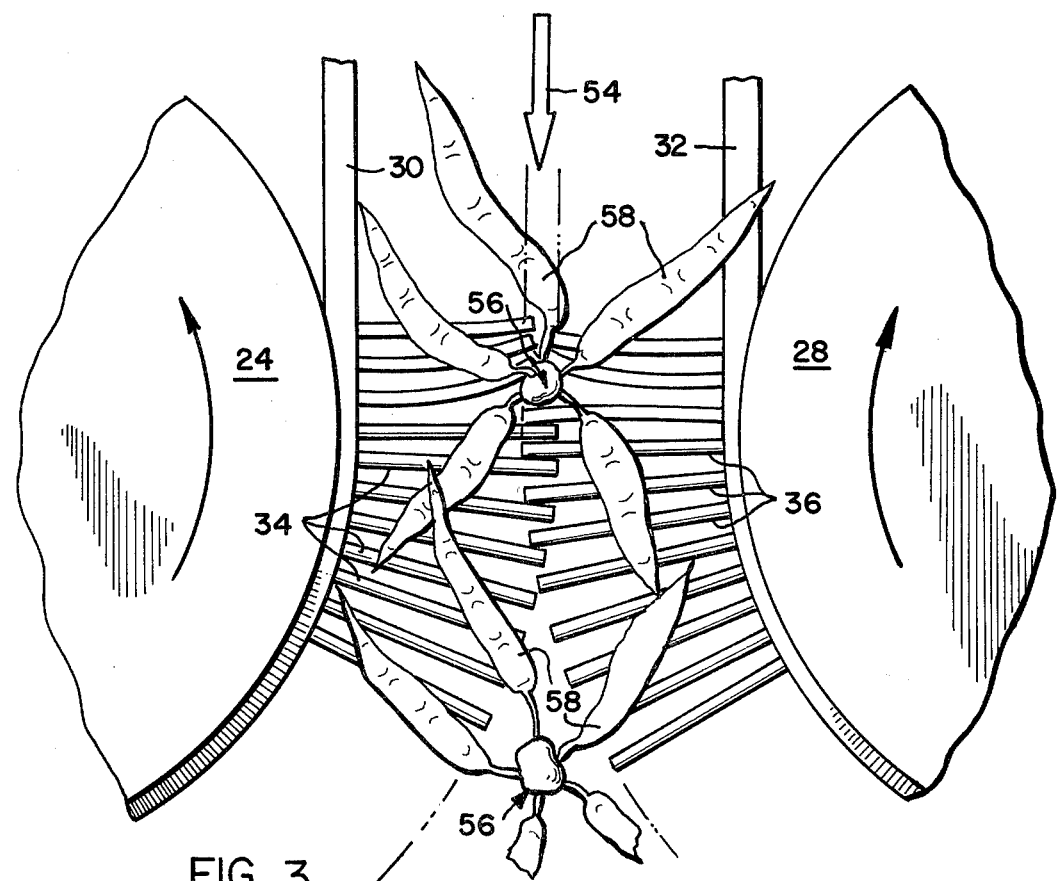
FIG. 3 is an enlarged partial plan view of the apparatus of the present invention showing the beans or similar crops being gently lifted up and supported by the flexible pins.

There is shown in the drawings apparatus 10 for harvesting beans or similar crops which generally comprises a frame 12 for supporting two pairs of axles 14, 16 and 18, 20, respectively. The axles 14–20 may be mounted on the frame 12 by any appropriate manner, such as, for instance, bearings 21. Axles 14 and 16 have pulleys 22 and 24 coaxially mounted thereon while mounted on axles 18, 20, respectively, are a complimenting pair of pulleys 26, 28. A first flexible belt 30 is mounted to engage pulleys 22 and 24 while a second flexible belt 32 engages pulleys 26 and 28. The belts 30, 32 may be of any acceptable shape such as V-belts, etc., while the pulleys would be chosen to compliment them. A plurality of flexible protruding members 34, 36 are positioned about the periphery of flexible drive belts 30 and 32, respectively, and are chosen to be of such length as to enable them to intermesh slightly when they are positioned opposite each other, as best seen in FIG. 3.

Figure 1:
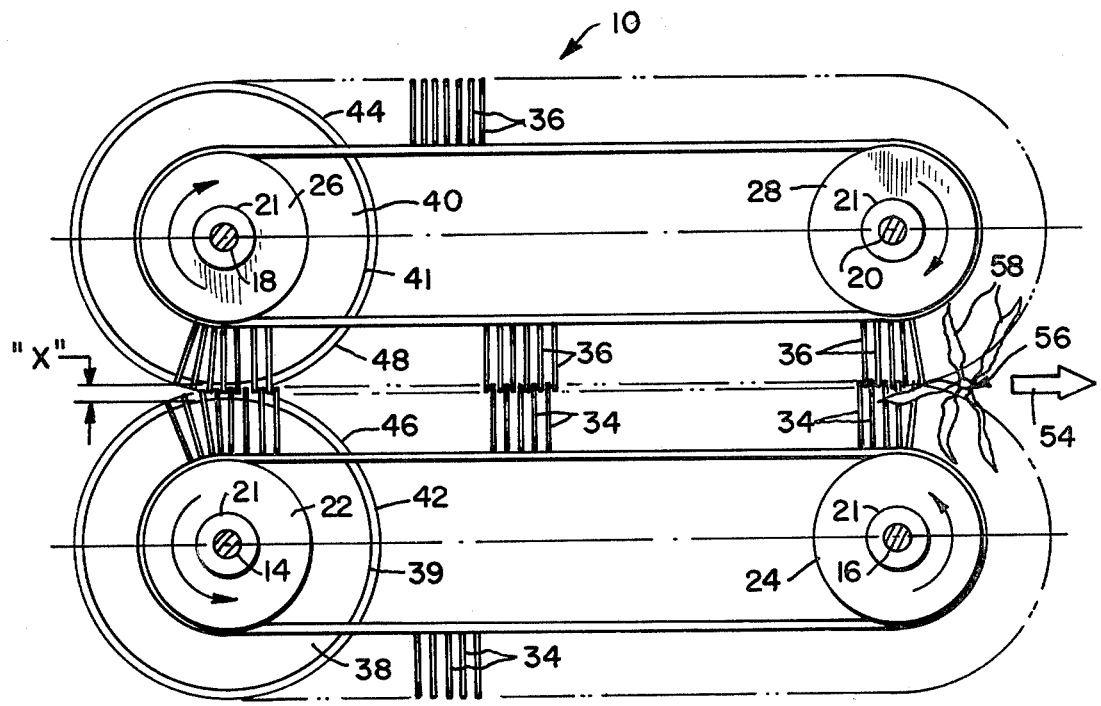
FIG. 1 is a plan view of apparatus for harvesting beans or similar crops according to the present invention.

A first stripper disc 38 is coaxially mounted on the axle 14 below pulley 26 while a second stripper disc 40 is similarly coaxially mounted on axle 18 below pulley 26. The two stripper discs 38 and 40 are situated on the axles 14 and 18 so that they are directly opposite each other. Further, they are of such a preselected diameter that a small clearance space "x", as best seen in FIGS. 1 and 5, is left between the outer edges 39, 41 of discs 38 and 40, respectively, the importance of which will be detailed more fully in the following description.

Figure 4:
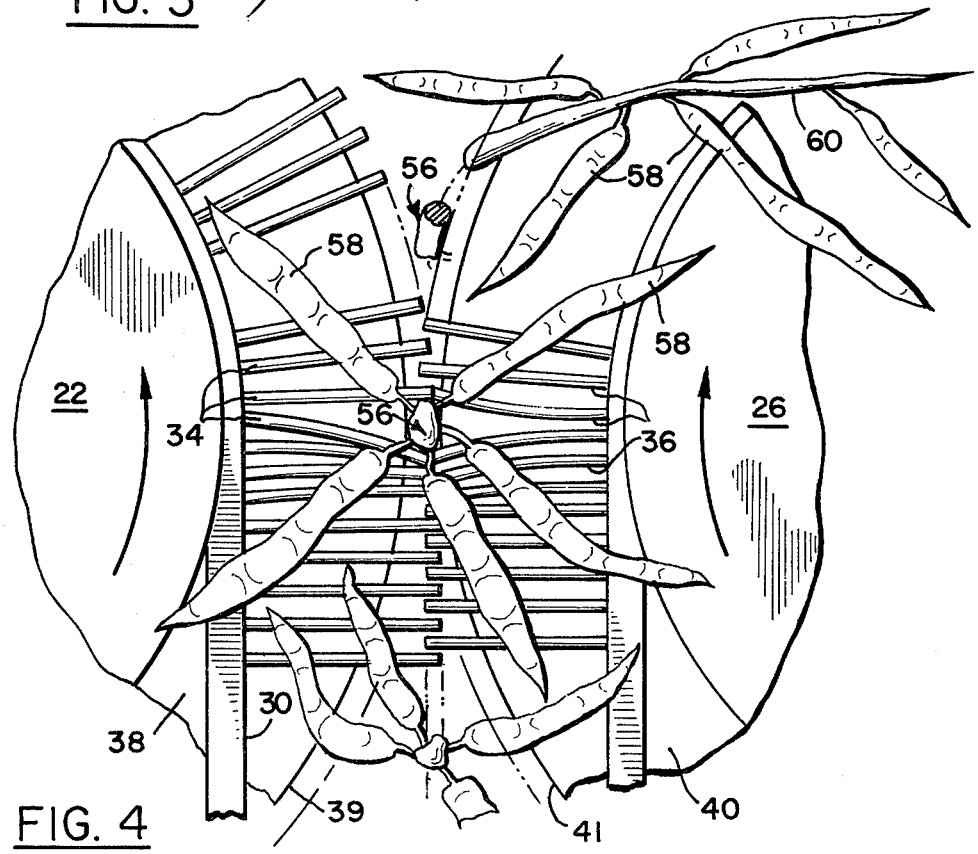
FIG. 4 is an enlarged partial top view showing the stripper discs separating the bean pods from the stalks and the cutter discs cutting the stalk near the ground.

A pair of cutter discs 42, 44 are coaxially mounted on axles 14 and 18 below stripper discs 38 and 40, respectively, and are located on the axles so that they are opposed to one another. The perimeters of cutter discs 42, 44 are ground so that sharpened edges 46, 48 are produced, respectively, thereon. The cutter discs 42, 44 are axially arranged and sized so that the sharpened edges thereof are in close proximity to each other, and in fact, may overlap slightly as best seen in FIG. 4. An appropriate means of imparting rotary motion to the axles 14–20 and the associated pulleys, stripper discs and cutter discs mounted thereto, such as hydraulic motor 50, may be mounted to the frame 12. The hydraulic motor 50 may be driven by a fluid connection (hoses) to the farm implement being used. Also, it is preferable to mount the motor 50 alone or with a pump, if desired, above the pulleys, etc., as best seen in FIG. 5, to aid in keeping out the dirt and other foreign matter from the pump, motor and drive mechanisms associated therewith.

Figure 2:
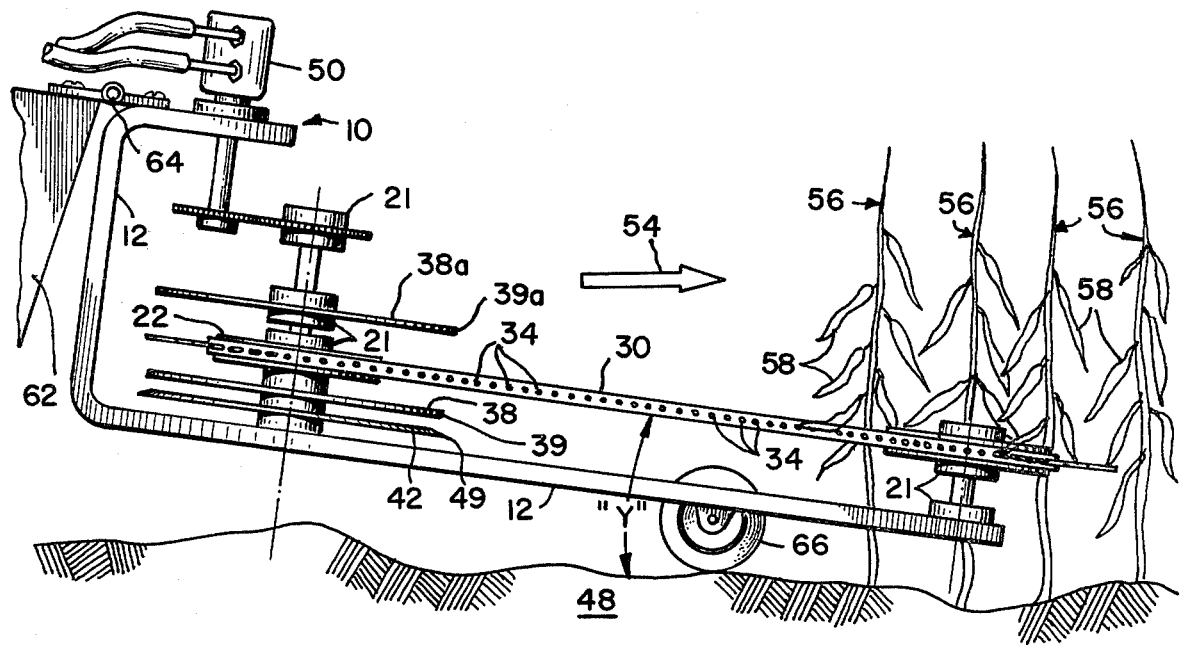
FIG. 2 is a side elevational view of the apparatus of FIG. 1 being used in harvesting a row of beans or similar crops.
Figure 5:
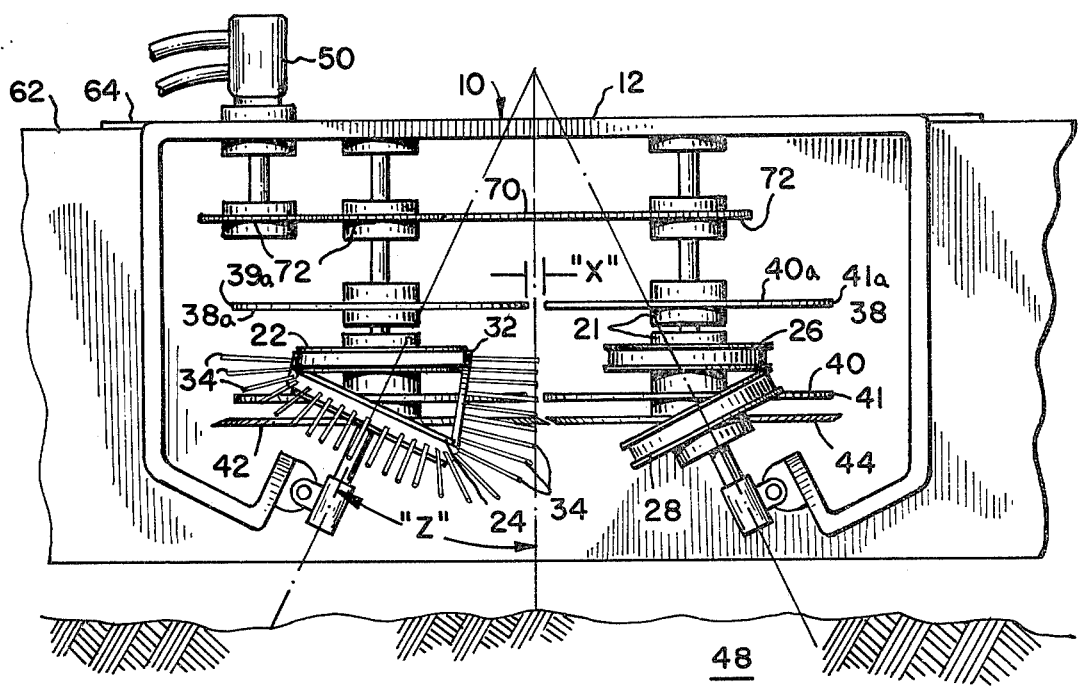
FIG. 5 is a front view of the apparatus showing the front pulleys being angularly displaced with respect to the ground being worked.

The motor 50 can be mechanically set up by any appropriate means, such as a chain drive, which consists of chain 70, and sprockets 72 as best seen in FIGS. 2 and 5, so as to drive the axles 14 and 18 in opposite directions. Axle 14 may be, for instance, driven counterclockwise while axle 18 would be driven in a clockwise manner. It will be appreciated that the flexible pins 34 and 36 mounted to belts 30 and 32, respectively, are moved linearly as the axles are rotated, as best seen in FIG. 2. As stated earlier, the pins 34 and 36 are of such a length that slight overlap between them will exist. This overlapping engagement can best be seen in FIGS. 3 and 4.

Referring back to FIG. 2, it will be seen that the bean harvesting apparatus 10 has the supporting frame 12 mounted such that the axles 14–20 are caused to be angularly disposed with respect to the earth 52, by indicated as angle "Y". As the harvesting apparatus 10 is moved long its harvesting path, shown by arrow 54, the rotating belts 30, 32 present the flexible pins 34, 36 to the bean plants 56. The harvesting apparatus 10 moves down the row of bean plants 56 and the bean pods 58 are caused to be gathered in and supported by the flexible pins 34, 36. The speed of movement of the belts 30, 32 and the pins 34, 36 carried respectively thereon, preferably matches almost exactly the ground speed of the farm implement being used. In this way the bean plants 58 are gathered up between the juxtaposed pair of pulleys by the moving pins 34, 36 at the same rate of speed as that of the farm apparatus. The gathered bean plants 58 are neither conveyed up the moving belts at a speed faster nor slower than speed at which the harvester is being operated. This is an important feature of the invention in that the bean plants are not damaged in any way by the speed of the belts and pins not matching the ground speed of the harvester which would tend to rip the plants from the ground.

As best shown in FIG. 2, the pin supporting belts 30, 32 are angularly displaced ("Y") with respect to the ground 52 and are thereby presented to the bean plants 56 in a tilted manner such that the bean pods 58 are gently lifted up from their dropping posture close to the ground 52 and supported by the pins above the top of the belts 30 and 32. The pins 34, 36 are fabricated from a material which would be flexible enough to insure that the bean pods 58 are supported with no injury done to them. Further, the pins 34, 36 will not impale the bean plants 56 nor will they slash or otherwise damage the plants. The pins 34 and 36 also will prevent any bean pods 58 from falling to the ground, which bean pods would then be lost to harvesting.

As the harvesting apparatus 10 is moved along its path of travel 54, the rows of bean plants 56 being harvested would normally be situated so as to be centered approximately between the front pair of rotating pulleys 24, 28. The bean plants 56 would be gathered in by the flexible fingers 34, 36 carried by the belts 30, 32, respectively, as best seen in FIG. 3. The inclination "Y" that the drive belts 30, 32 establish with the ground, as best illustrated in FIG. 2, causes the bean pods 58 which are dangling close to the ground to be gently raised up from their normally drooping position. That is, as the belts move longitudinally they are also moving in an upward manner from the front pair of rotating pulleys 24, 28 toward the rear pair of pulleys 22, 26. This enables the flexible pins 34, 36 to first engage the bean plant 56 at a position on the plant close to the ground and thereafter, to move up the bean plant 56 to engage the bean pods 58. It will be seen that the bean pods are in this way gently collected from their normally drooping posture and raised to a level where proper harvesting may take place.

Once the bean plant has been collected up between, and supported by, the flexible pin 34, 36 the crop is introduced to the area between the rear pulleys 22, 26. Here the bean plant 56 is simultaneously cut at its lower reaches by cutters 42, 44 and stripped from the flexible pins 34, 36 by stripper discs 38, 40. The cut bean pods 58 and tops 60 are then thrown off the cutting apparatus 10 and into a hopper 62 where the bean crop would be separated from the shell and tops. In more detail, and by referring to FIG. 4, it will be seen that as the conveyed bean plant 56 reaches the area of the rear pulleys 22, 26 it is presented to the cutters 42, 44 which shear the stalk at a selected position on the stalk. Just above the cutters 42, 44 are stripper discs 38, 40 which are preferably constructed of a pliable material. Simultaneously to cutting, the bean plant is being engaged by the perimeters 39, 41 of stripper discs 38, 40, respectively. The firm engagement of the severed stalk by the stripper discs tends to prevent the crop from remaining within the confines of the flexible pins which would then be free to move around with the revolving belts 30, 32, to possibly be reintroduced to the harvesting process and to cause a subsequent jam. By having the stripper discs 38, 40 engage the crop as it is being severed, the crop is prevented from causing clogs and is readily freed from the flexible fingers 34, 36 to be thereafter ejected from the apparatus into the hopper 62. It may be desirable, as shown in FIGS. 2 and 5, to mount a second set of stripper discs 38a, and 40a, to respective axles 14, 18 and above the pulleys 22, 26. The stalk of the bean plant 56 would, in this way, be firmly supported above the bean pod supporting pins, 34, 36 as well as below.

Figure 6:
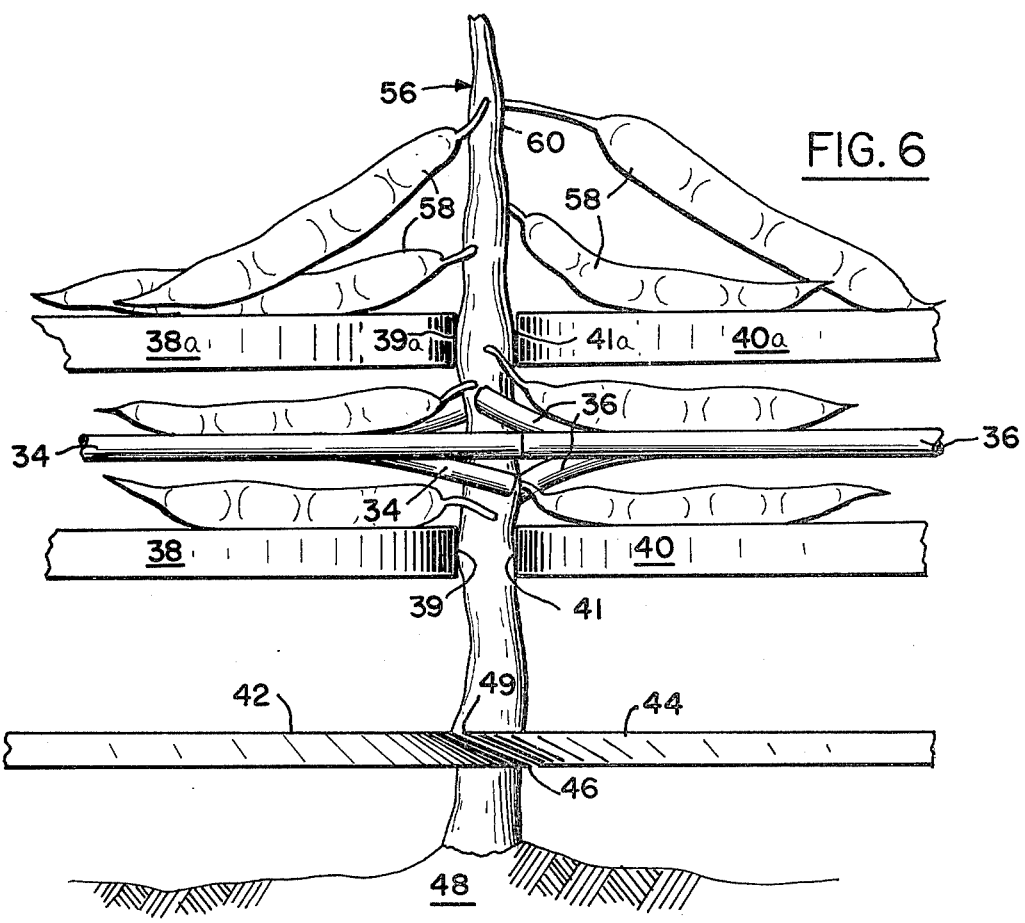
FIG. 6 is an enlarged partial view of the apparatus showing the stripper discs gripping the bean stalk and the cutter discs severing the stalk at the base.

Referring to FIG. 5, it may be desirable to arrange to have the harvesting apparatus gather in the crop at a point closer to the ground than has been possible in the past. To this end it has been found desirable to provide a mounting means wherein the front pulleys 24, 28 can be canted at an angle "Z" with respect to the ground 48. It has been found that providing adjustment to the angular displacement of the pulleys 22, 28 such as is shown at 68, is most desirable, although other means for setting the angular displacement may be used. In this way various field conditions contemplated can be provided for and the proper angle "Z" can be set so that the pulleys 24, 28 may be exactly positioned. For convenience of illustration and for clarity, the belt 32 and pins 36 have been deleted from FIG. 6.

It has also been found that it may be advantageous to hinge the harvesting apparatus 10 to the farm implement being used, and which is shown in FIGS. 2 and 5 being attached to the apparatus 10 at, for instance, the hopper 62 by pivot 64. Also, a means of engaging the ground 48, such as a wheel 66 may be mounted to the frame 12 so that the apparatus 10 pivots about pivot 64 as the ground condition changes, e.g., the wheel rides up or down in bumps or gulleys.

It is, of course, obvious that various changes may be made to the form and details of the above-described apparatus without departing from the spirit or scope of the invention. Accordingly, the foregoing description should be taken as illustrative.

What is claimed is:

1. Apparatus for use in harvesting beans and similar crops grown in substantially parallel, spaced apart rows, comprising:
   a frame;
   at least two pairs of cooperating drive pulleys rotatably mounted on said frame, each of said pairs of pulleys being mounted in tandem and having a front pulley and a rear pulley, said two pairs of drive pulleys arranged in a spaced apart relationship;
   separate belts mounted on each of said pairs of drive pulleys and rotatable therewith, said belts being disposed in side-by-side relationship, each separate belt carrying thereon flexible support means for gently engaging and supporting said beans or similar crops from a point proximate the front pulleys to a point proximate the rear pulleys of each of said pairs of cooperating drive pulleys as the harvest-apparatus is moved along the row of crops being harvested;
   means for driving said pulleys and thereby said belts at a speed closely approximating the speed at which the harvesting apparatus is being driven over the ground;
   cutting means mounted coaxially with each of said rear pulleys of said pairs of pulleys for cutting the tops of the plants having pods thereon from the stalks of said crop being harvested at a preselected location on the stalk; and
   stripper means mounted coaxially with each rear pulley of said pairs of pulleys for engaging the cut stalks of the harvested crop at an appropriate position on the stalk for stripping the cut stalks from the flexible support means to thereby expel the harvested crop.

2. The apparatus, as set forth in claim 1, wherein said flexible support means comprises a plurality of protruding members.

3. The apparatus, as set forth in claim 2, wherein said protruding members are positioned about the periphery of each of said drive belts in opposing relationship.

4. The apparatus for harvesting beans, as set forth in claim 2, wherein said protruding members are positioned on each drive belt with a slight overlap of the members on one of said belts with the opposing members on the other of said belts when portions of said belts are opposite each other.

5. The apparatus as set forth in claim 1, wherein said stripper means comprises at least one circular disc mounted coaxially with each rear pulley of said pairs of pulleys.

6. The apparatus, as set forth in claim 5, wherein said discs are mounted with a clearance space between the perimeters thereof.

7. The apparatus, as set forth in claim 5 wherein said circular discs are pliable.

8. The apparatus, as set forth in claim 1, wherein said cutting means comprises cutting discs mounted coaxially with each rear pulley, each disc having a radius which when added to the radius of the other disc is at least substantially equal to the distance between the axles of said discs so as to enable full engagement with the stalks of the crop and severing thereof.

9. The apparatus as set forth in claim 1, wherein said front pulleys of each of said pairs of pulleys are disposed on said frame below said rear pulleys of said pair of pulleys and are closer to the ground than the rear pulleys thereof.

10. The apparatus, as set forth in claim 1, wherein the front pulleys of each of said pairs of pulleys are angularly tilted inward toward each other to bring said front pulleys and said belts downward toward the ground.

11. The apparatus, as set forth in claim 1, wherein said front pulleys include means cooperating between said frame and said pulleys for providing angular adjustment between said pulleys and said frame.

12. The apparatus as set forth in claim 1, wherein said drive means comprises means for driving both of said rear pulleys and belts in synchronism with each other.

13. The apparatus, as set forth in claim 11, wherein said drive means comprises a motor, a chain, sprockets connected to said rear pulleys and to said motor, said chain being disposed in driving relationship with said sprockets, such that said rear pulleys and belts are driven synchronously with each other.

14. The apparatus, as set forth in claim 1, wherein means are provided for pivotal attachment of said frame at the rear thereof, to associated harvesting apparatus.

15. The apparatus, as set forth in claim 13, further comprising a wheel attached to said frame at the front thereof.

* * * * *